United States Patent [19]
Ferris

[11] Patent Number: 4,865,501
[45] Date of Patent: Sep. 12, 1989

[54] SLIDE FASTENER SYSTEM

[76] Inventor: Boyd M. Ferris, 1604 Hurley, Fort Worth, Tex. 76104

[21] Appl. No.: 123,942

[22] Filed: Nov. 23, 1987

[51] Int. Cl.⁴ .......................................... F16B 21/00
[52] U.S. Cl. .................................. 411/340; 411/345; 24/453
[58] Field of Search .................. 24/453; 411/340, 344, 411/345

[56] References Cited

U.S. PATENT DOCUMENTS

| | | | |
|---|---|---|---|
| 450,127 | 4/1891 | Wrigley | 411/340 |
| 549,069 | 10/1895 | Lever | 411/340 |
| 1,061,480 | 5/1913 | Kennedy | 411/340 |
| 4,286,497 | 9/1981 | Shamah | 411/345 |
| 4,439,079 | 3/1984 | Losada | 411/340 |
| 4,573,844 | 3/1986 | Smith | 411/340 |
| 4,657,461 | 4/1987 | Smith | 411/340 |

Primary Examiner—Victor N. Sakran
Attorney, Agent, or Firm—James E. Bradley

[57] ABSTRACT

A slide fastener and apparatus is provided for securing a fixture having a hole therethrough to a surface having a hole therethrough. The apparatus comprises a brace that operates in two positions: a retracted position for insertion through the aligned holes, and a locking position that is substantially perpendicular to the central axis of the aligned holes. A tail is flexibly connected to the mid-section of the brace and adapted to slidably carry a lock piece that urges the brace to the locking position and bears upon the fixture to secure the fixture to the surface. The lock piece may be advanced inward toward the brace, but not retracted outward away from the brace.

1 Claim, 2 Drawing Sheets

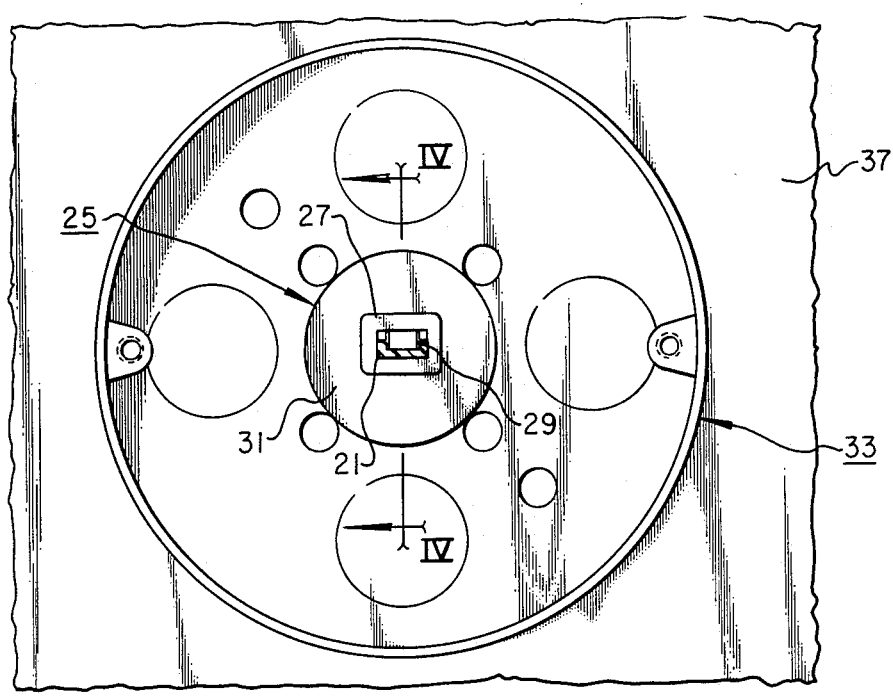
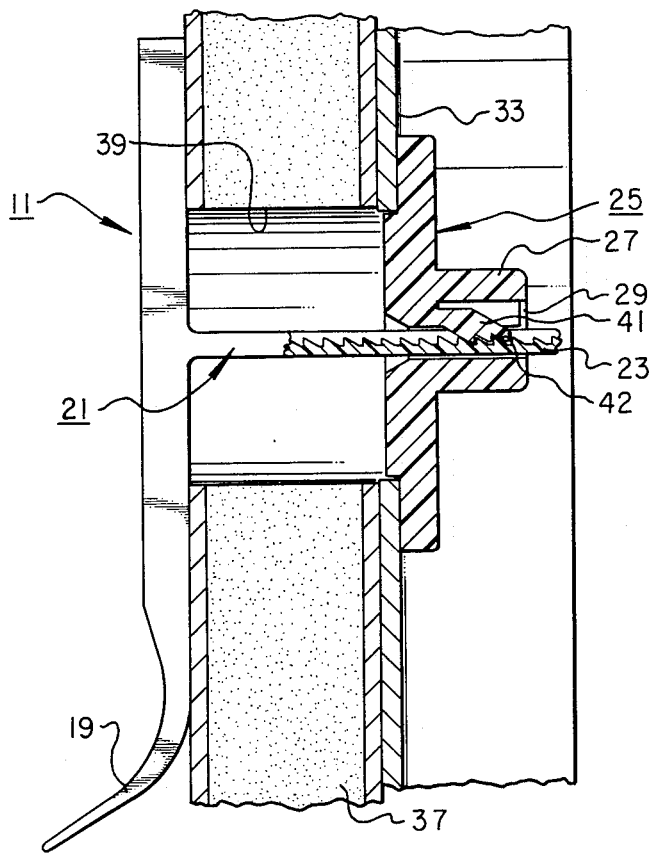
Fig. 3
Fig. 4

SLIDE FASTENER SYSTEM

BACKGROUND OF THE INVENTION

1. Field of the Invention

This invention relates generally to fastening apparatus for use in the construction industry, and specifically to a fastener for securing fixtures having a hole therethrough to a surface having a hole therethrough.

2. Description of the Prior Art

It is the current practice in the construction industry to utilize the toggle bolts to secure fixtures, such as lighting fixtures to a ceiling or wall.

The typical toggle bolt comprises a bolt, a nut, and two spring biased wings surrounding the nut. These wings are collapsible in one direction only. This allows the nut and wing assembly to be inserted through a hole in the wall or ceiling.

In operation, the bolt is connected to the nut and wing assembly. Next a hole is drilled in the surface large enough to accommodate the collapsed wing and nut assembly. This assembly is inserted in the hole. The spring biases the wings outward, preventing the removal of the wing and nut assembly through the drilled hole. Finally, the bolt is tightened as desired.

Toggle bolts are necessary when the installer of a fixture does not have access to both sides of the surface. This is often the case in housing construction, where most walls are made of two layers of wallboard nailed over a wooden frame. Rarely does the installer of a fixture have access to both sides of a piece of wallboard.

Moreover, the wallboard is not sturdy enough to accept and hold a wood screw. The installer may attach a fixture plate by driving wood screws into the studs where possible. However, these studs are rarely located where the fixture is required. Accordingly, toggle bolts are almost always used to install fixtures in ceilings and walls of structures.

Toggle bolts are relatively expensive compared to other fastening devices, such as bolts, and screws. They are also relatively time consuming to install.

SUMMARY OF THE INVENTION

The present invention is an apparatus that can be used, much like a toggle bolt, to secure a fixture or fixture plate to a ceiling or wall. This invention also comprises an improved method of fastening fixtures to a surface.

In this application, the word "fixture" comprehends any structure that can be secured to a surface utilizing toggle bolts, nails or screws, including but not limited to light fixtures, electrical boxes, conduits, shelving, and pictures.

The apparatus is used to secure a fixture having a hole to a surface having a hole, when the hole of the fixture, or fixture plate, is aligned with the hole of the surface. The apparatus has a brace capable of taking two positions relative to a flexibly connected tail.

First, the brace must take a position that allows for its insertion through the aligned holes. In this document, this position is referred to as the "retracted position", which is when the brace is substantially parallel to the tail and also parallel to the central axis of the aligned holes.

The second position is referred to as a "locking position" in which the brace is substantially perpendicular to the flexibly connected tail, and also substantially perpendicular to the central axis of the aligned holes.

A lock piece is slidably carried by the tail. This lock piece is adapted in size to be immovable through the hole of the fixture. A means for permitting the advancement of the lock piece inward along the tail towards the brace is provided. In the preferred embodiment, this means comprises a series of teeth on at least one side of the tail, and a means for engaging the teeth, carried by the lock piece. This lock piece allows movement in only one direction, toward the brace; it opposes retraction of the lock piece outward along the tail from the brace.

The method of this system includes the steps of providing a brace pivotally connected to a tail that carries a slidable lock piece; cutting a hole in the surface that is larger than the width of the brace when the brace is in a retracted position, but smaller than the brace when the brace is in a locking position; aligning the holes of the fixture with the holes of the surface; inserting the brace and sliding the lock piece forward, urging the brace to a locking position and holding the fixture against the surface.

The above as well as additional objects, features, and advantages of the invention will become apparent in the following detailed description.

DESCRIPTION OF THE DRAWING

FIG. 3 is a side view of the fixture plate held in contact with the surface by the lock piece.

FIG. 4 is a cross-sectional view of FIG. 3 as seen along the lines IV—IV, depicting the brace, wall, fixture plate, and lock piece in cross-section.

DESCRIPTION OF THE PREFERRED EMBODIMENT

Figures 1, 2:
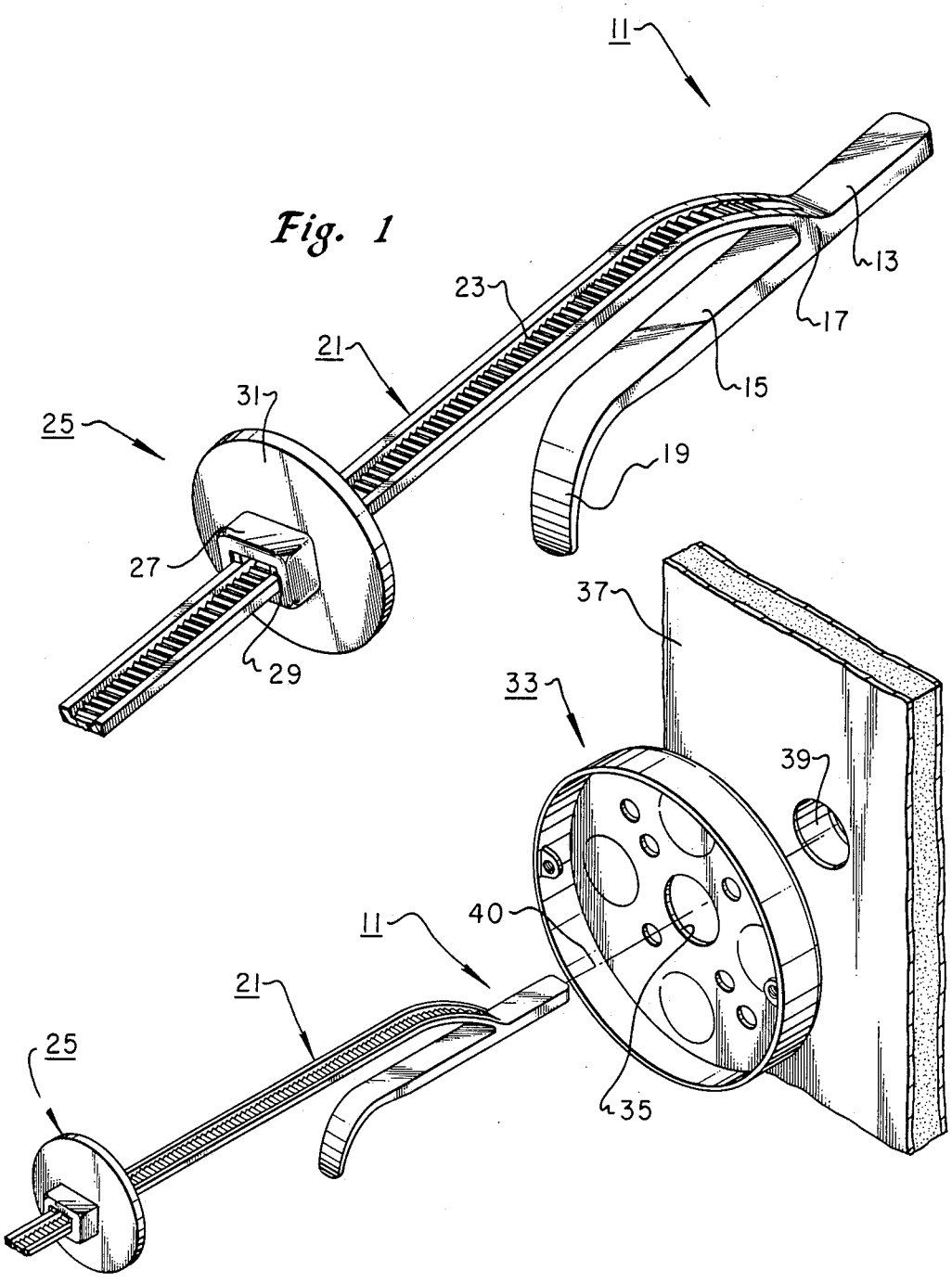
FIG. 1 is a perspective view of the slide fastener system.
FIG. 2 is a perspective view of the slide fastener system, depicting the alignment of the hole of the surface, the hole of the fixture plate, and the slide fastener system in retracted position.

FIG. 1 is a perspective view of the slide fastener system. Brace 11 is a rectangular member, having two rigid and solid ends 15, 13, and a rigid and solid middle section 17. A flexible appendage 19 extends from one end 13 or 15, and is integrally joined to the brace 11. In this view, flexible appendage 19 is connected to end 15. Flexible appendage 19 is thinner than the brace 11, and tapers in width as the appendage 19 extends away from end 15. The flexible appendage 19 is also slightly curved. Flexible appendage 19 is provided, not as a hand hold, but as a pivot for brace 11.

Tail 21 is flexibly connected to middle section 17 of brace 11. In the preferred embodiment, tail 21 and brace 11 are integrally joined, and composed of nylon, or a similar synthetic material that can withstand wide temperature variations. The tail 21 is a flat rectangular strip, having a groove 22 that runs the entire length of one side of the tail 21. In this groove 22, a plurality of teeth 23 are disposed, integrally joined to the tail 21. These teeth 23 are triangular shaped, and slightly tilted toward the brace 11.

Lock piece 25 is slidably carried by tail 21. The lock piece 25 is composed of a lock member 27, which has a rectangular opening 29 that receives tail 21. Lock piece 25 also has a disk-shaped shoulder 31. The lock member 27, opening 29, and shoulder 31 are integrally formed from a single piece of nylon, or similar synthetic material.

FIG. 2 is an exploded view showing the slide fastener system in the retracted position, aligned for insertion through fixture plate 33 and wallboard wall 37. In this application, the word "fixture" comprehends any structure that can be secured to a surface utilizing toggle bolts, nails, or screws, including but not limited to light fixtures, electrical boxes, conduits, shelving, and pictures.

In this figure, the fixture plate 33 shown is an electrical box comprising a circular metal disk having a plurality of orifices, including a fixture hole 35, located at the center of the fixture plate 33. The fixture plate illustrated in FIG. 2 is representative of one type of fixture plate encountered in the construction industry. Of course, other fixtures, and fixture plates, can have configurations different from that depicted in FIG. 2. For example, fluorescent light fixtures are usually rectangular shaped, having a plurality of holes for affixing the fixture to the ceiling of a structure.

The fixture plate 33 is aligned over a hole 39 provided in wallboard wall 37. This alignment is along an imaginary line that is a central axis 40, perpendicular to the planes of both surface hole 39 and fixture hole 35.

FIG. 2 illustrates how the brace 11, which is in a retracted position, is substantially parallel to tail 21 and the central axis 40 of the aligned fixture hole 35 and wall hole 39. The tail 21 is slightly curved where it joins the brace 11, when in the retracted position. The brace 11 is adaptable to a second position, referred to as the locking position. In the locking position, the brace 11 is substantially perpendicular to the central axis 40 of the aligned holes 35, 39.

Brace 11 must be adapted in width to be insertable endwise through the aligned fixture hole 35 and wall hole 39. The brace 11 must also have a length that exceeds the diameter of the wall hole 39, to prevent the removal of brace 11 after insertion.

FIG. 3 is a side view of the fixture plate 33 held firmly in place against wallboard wall 37 by lock piece 25. The shoulder 31 of lock piece 25 is larger in diameter than the fixture hole 35, which is now obscured by the lock piece shoulder 31. Lock member 27 is also depicted, with opening 29. The tail 21 is shown in opening 29; it has been cut at the opening 29 to remove excess length.

This configuration is further illustrated in FIG. 4 which is a cross-sectional view as seen along lines IV—IV of FIG. 3. The wallboard wall 37 is shown in cross-section with wall hole 39. Brace 11 is on the interior side of wallboard 37 and shown in FIG. 4 in the locking position, which is substantially perpendicular to the tail 21.

On the exterior side of wallboard wall 37 is fixture plate 33, and lock piece 25. Tail 21 is shown in partial cut-away view to expose teeth 23. The tail 21 inserts through the opening 29.

This cross-sectional view depicts interlocking digit 41. This interlocking digit 41 is a flexible member integrally formed in the upper region of lock member 27. It is biased downward, and partially obstructs the opening 29.

This interlocking digit 41 is designed to intermesh with the teeth 23 of tail 21, allowing the lock piece 25 to be moved inward along tail 21, but opposing the movement of the lock piece 25 outward along tail 21. The digit 41 is flexible enough to yield to the teeth 23 as the lock piece 25 is advanced inward toward the brace 11.

However, the digit 41 has one or more notches 42 that are adapted to mate with the slightly inward tilting teeth 23. When the notches 42 are mated with teeth 23, digit 41 is not flexible enough to allow movement of the lock piece 25 outward relative to the brace 11.

In operation, the installer decides upon a location for a fixture, such as a light fixture, on either a wall or ceiling of a structure. The installer drills a hole 39 into the wall 37 of the structure, having a diameter large enough to allow the insertion of the brace 11 endwise through the hole 39. However, the diameter of the hole 39 must be small enough to prevent the passage of the brace 11 through the hole 39 when the brace 11 is substantially perpendicular to the central axis 40 of the hole 39. Then, the installer aligns a fixture plate 33 having a hole 35 over the hole 39 in the wallboard wall 37.

Next, the brace 11 and tail 21 are held in a retracted position, namely the brace 11 and tail 21 are held substantially parallel to the central axis 40 of the aligned holes 35, 39, and to each other. Since the brace 11 is ordinarily in the retracted position, the operator need not manipulate the brace 11 relative to the tail 21 prior to insertion. The brace 11 and connected tail 21 are inserted through the aligned holes 35, 39.

Next, the tail 21 is pulled outward relative to the wall 37, while the lock piece 25 is advanced inward relative to the brace 11. This outward motion of the tail 21 will urge the outward-curving flexible appendage 19 into contact with the inner surface of wallboard wall 37. The flexible appendage 19 is slightly curved in the direction away from the flexible tail 21. As the tail 21 is pulled outward relative to the wallboard wall 37, the flexible appendage 19 serves as a pivot and urges the brace 11 into the locking position.

As the lock piece 25 is advanced inward along tail 21, interlocking digit 41 will yield to the teeth 23 of tail 21. Lock piece 25 will press fixture plate 33 toward wallboard wall 37.

As the fixture plate 33 and brace 11 are further compressed against wallboard wall 37 by the installer pulling tail 21 outward and pushing lock piece 25 inward, the static force at the interface of digit 41 and teeth 23 increases. Thus, the installer may produce a tighter, more secure lock by forcing the lock piece 25 ever inward.

Finally, the excess length of tail 21 is removed by cutting, so the tail does not obstruct the placement of the fixture (not shown).

This invention presents several distinct advantages over the prior art toggle bolts.

First, this side fastener can be constructed entirely of nylon, plastic, or similar materials. No metal parts are needed. Accordingly, this slide fastener can be constructed at a much lower cost than toggle bolts.

Second, this side fastener can be used with greater speed than existing toggle bolts. This invention can save considerable amounts of time in a large construction job where many toggle bolts must be employed to suspend a variety of fixtures.

While the invention has been shown in only one of its forms, it should be apparent to those skilled in the art that it is not so limited, but is susceptible to various changes without departing from the scope of the invention.

I claim:

1. A fastening apparatus adapted for use with a surface having a hole therethrough, comprising:

a cup-shaped fixture having a substantially flat bottom with a hole therethrough for alignment with said hole in said surface;

a solid brace having two ends and a mid-section, adapted in width to be inserted endwise through the aligned holes of said surface and said cup-shaped fixture when the brace is in a retracted position substantially parallel to the central axis of the aligned holes, the brace having a length greater than the diameter of the hole of the surface so as to be immovable through the aligned holes when the brace is in the locking position substantially perpendicular to the central axis of the holes;

a single flexible flat strap with ribs on both edges defining a recess therebetween with a plurality of locking teeth disposed along the length of the recess, having two ends with one end flexibly connected to the mid-section of the brace at a rigid point, wherein said strap is flexible and pivotal about said mid-section of said brace, and wherein said strap is adapted to allow the brace to be inserted through the aligned holes when the brace is held in the retracted position and to urge the brace to the locking position when pulled outward relative to the surface after insertion; and a lock piece having a substantially cylindrical disk-shaped base adapted in size to prevent the lock piece from passing through the hole in the cup-shaped fixture, having a substantially flat bottom side for bearing against said cup-shaped fixture, and having a top side with a locking means extending outwardly therefrom with a single opening adapted to accept said strap and engage said teeth with an angular jaw member, wherein the jaw member piece permits advancement of the lock piece inward relative to said brace but prevents retraction of the lock piece outward relative to the brace, and wherein the lock piece cooperates with the brace and interconnecting strap to secure the cup-shaped fixture to the surface.

* * * * *